(12) United States Patent
Kelnhofer et al.

(10) Patent No.: US 8,511,179 B2
(45) Date of Patent: Aug. 20, 2013

(54) AIRCRAFT CONDUIT MONITORING SYSTEM AND METHOD

(75) Inventors: Jürgen Kelnhofer, Jork (DE); Dariusz Krakowski, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 194 days.

(21) Appl. No.: 12/999,752

(22) PCT Filed: Jun. 17, 2009

(86) PCT No.: PCT/EP2009/004368
§ 371 (c)(1),
(2), (4) Date: Jun. 16, 2011

(87) PCT Pub. No.: WO2009/153033
PCT Pub. Date: Dec. 23, 2009

(65) Prior Publication Data
US 2011/0247432 A1    Oct. 13, 2011

Related U.S. Application Data

(60) Provisional application No. 61/074,185, filed on Jun. 20, 2008.

(30) Foreign Application Priority Data

Jun. 20, 2008    (DE) .......................... 10 2008 029 469

(51) Int. Cl.
*G01F 1/78* (2006.01)

(52) U.S. Cl.
USPC ....................................................... 73/861.351

(58) Field of Classification Search
USPC .................. 73/861.02, 49.2, 861.351; 62/86; 702/50
See application file for complete search history.

(56) References Cited

U.S. PATENT DOCUMENTS 3,691,821 A * 9/1972 Davey ............................ 73/49.2
5,272,646 A   12/1993 Farmer
5,295,391 A * 3/1994 Mastandrea et al. ........... 73/49.2
(Continued)

FOREIGN PATENT DOCUMENTS

| CN | 1321846 | 11/2001 |
| DE | 1961928 | 6/1970 |
| GB | 2443964 | 5/2008 |
| WO | 2005015326 | 2/2005 |

OTHER PUBLICATIONS

European Patent Office, International Search Report, Mar. 4, 2010.
Chinese Patent Office Action, Dec. 5, 2012, 6 pages.

*Primary Examiner* — Jewel V Thompson
(74) *Attorney, Agent, or Firm* — Wood Herron & Evans LLP

(57) ABSTRACT

An aircraft conduit monitoring system includes conduit that conducts gas from a source to a point of application. A flow sensing device and a pressure sensing device are provided within the conduit. At least one set value of a gas mass flow rate and at least one set value of a pressure are sensed in a learning mode of operation. The set values are compared with sensed actual values in the normal mode of operation. A gas volume flow rate can also be sensed and processed instead of a gas mass flow rate.

13 Claims, 7 Drawing Sheets

(56) References Cited

U.S. PATENT DOCUMENTS

| | | | |
|---|---|---|---|
| 5,601,071 A * | 2/1997 | Carr et al. | 126/116 A |
| 6,148,677 A * | 11/2000 | Evangelista | 73/861.02 |
| 7,918,238 B2 * | 4/2011 | Tanaka et al. | 137/10 |
| 8,155,896 B2 * | 4/2012 | Wargo et al. | 702/50 |

* cited by examiner

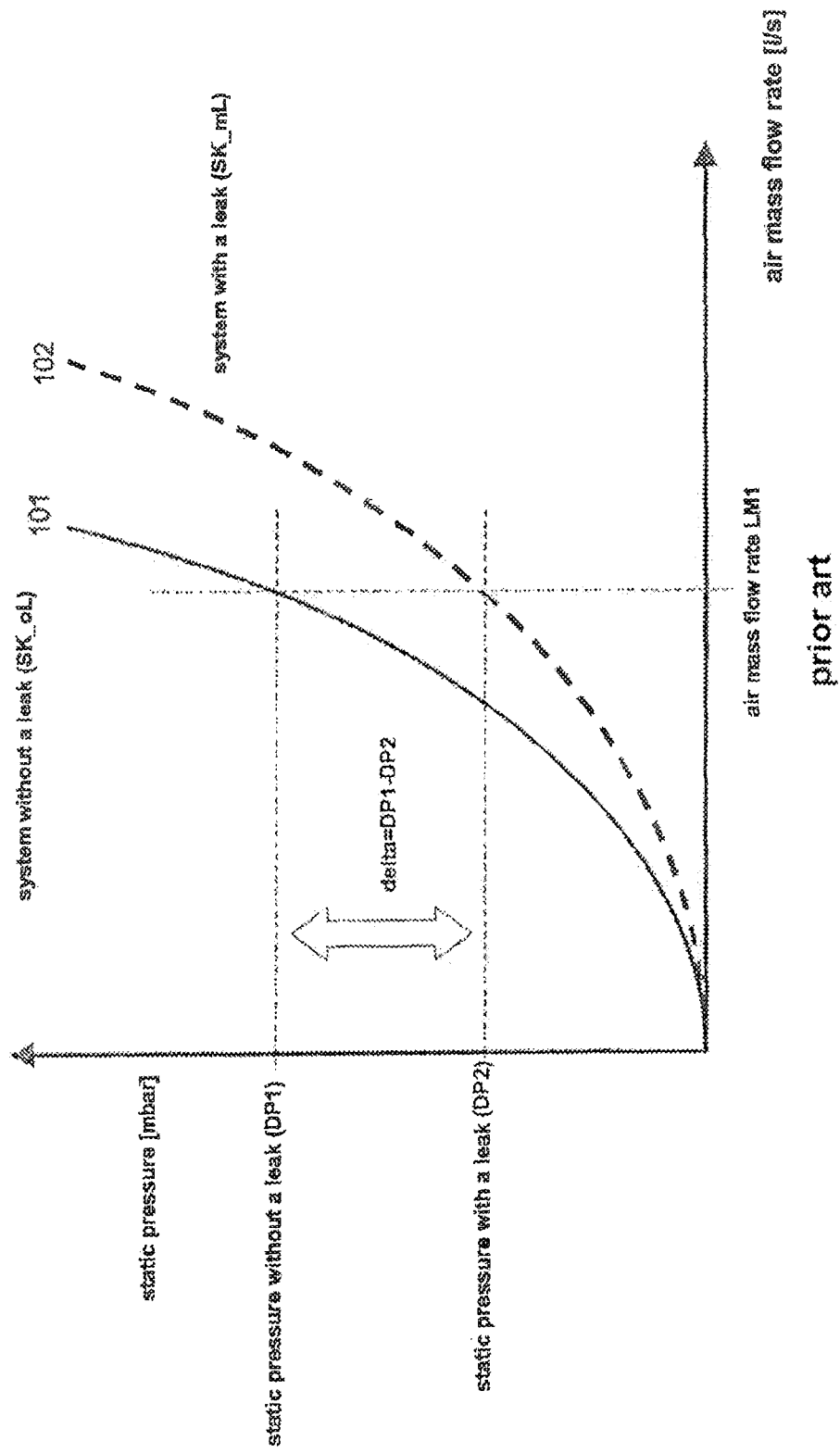

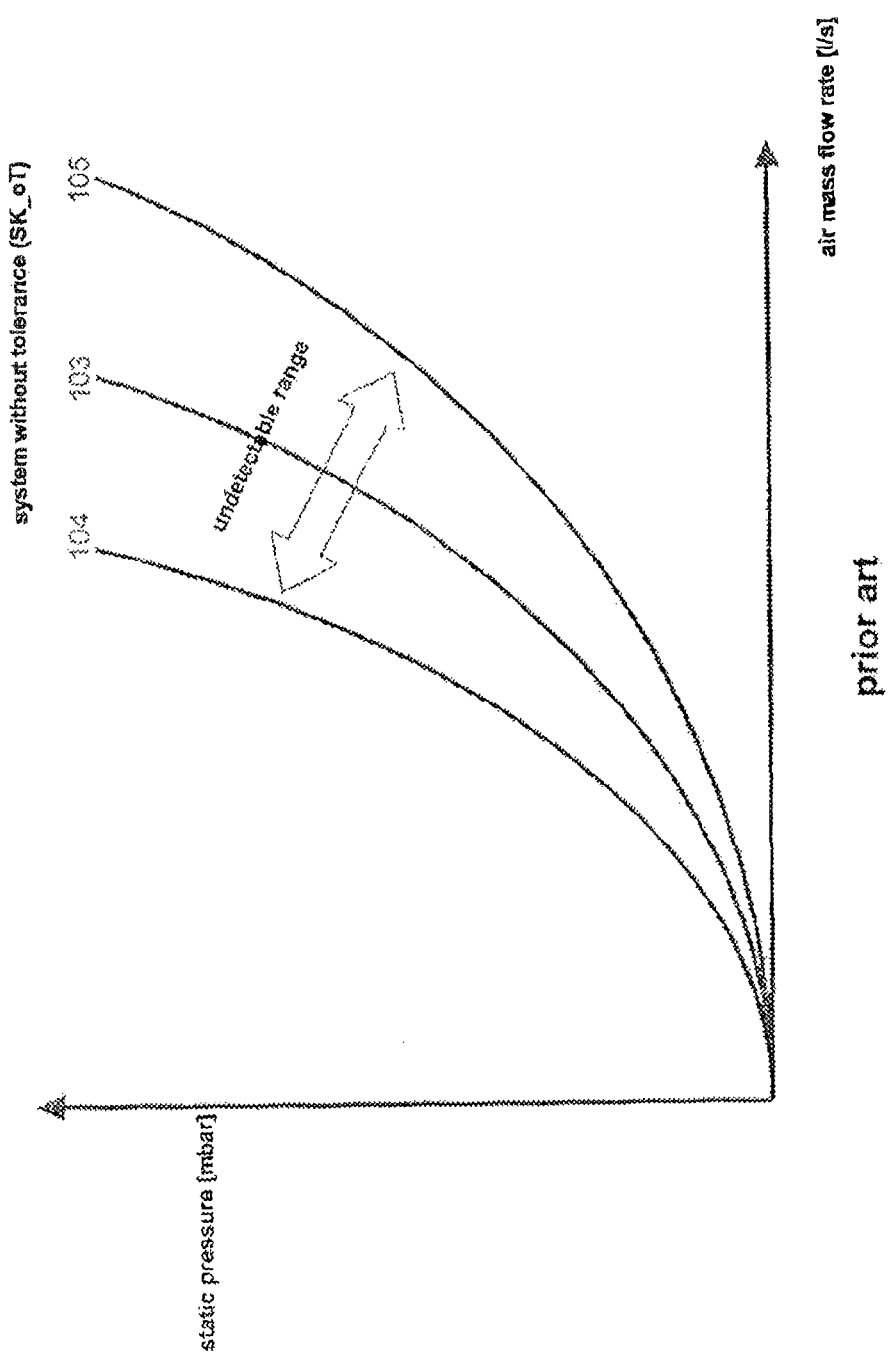

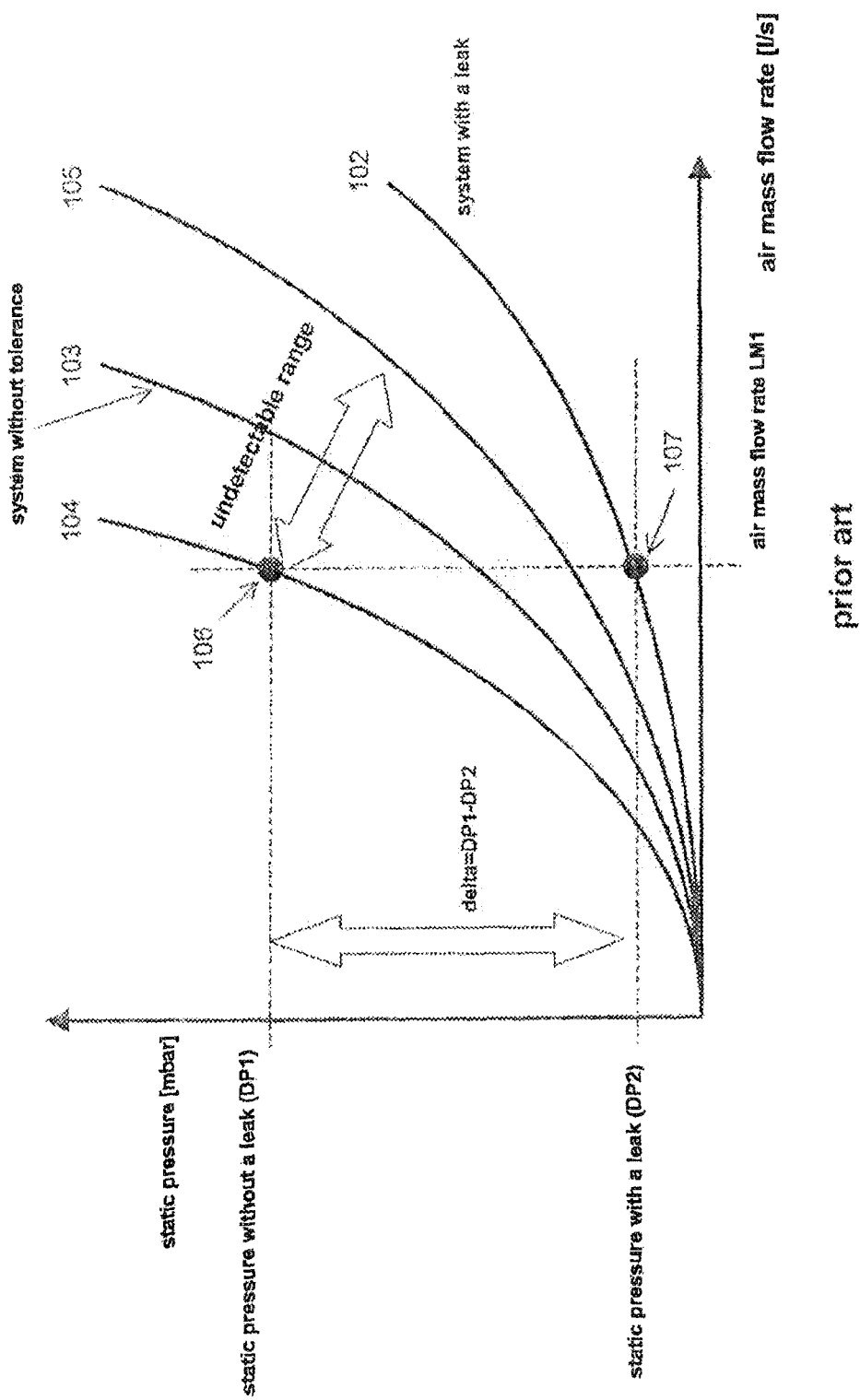

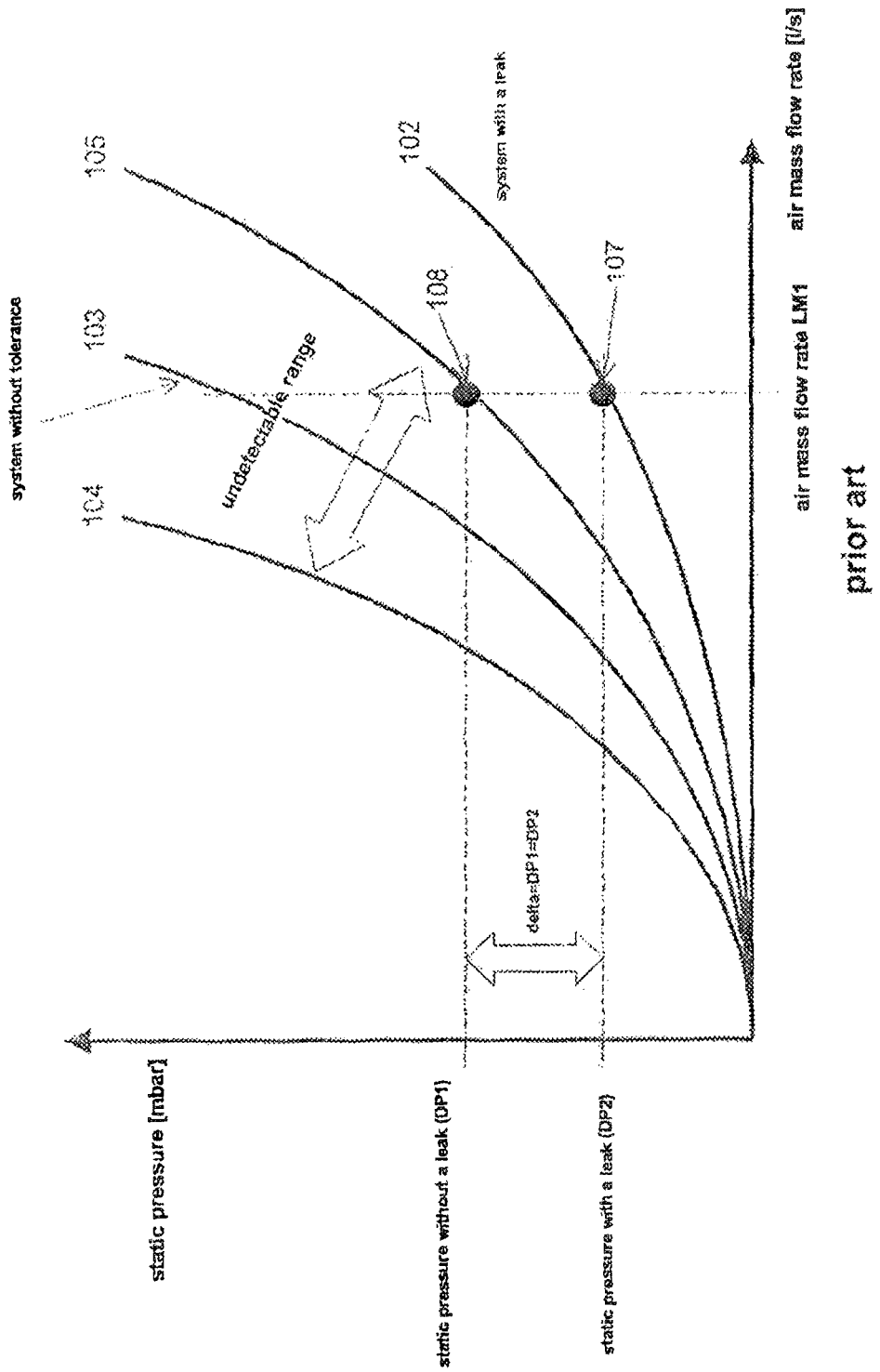

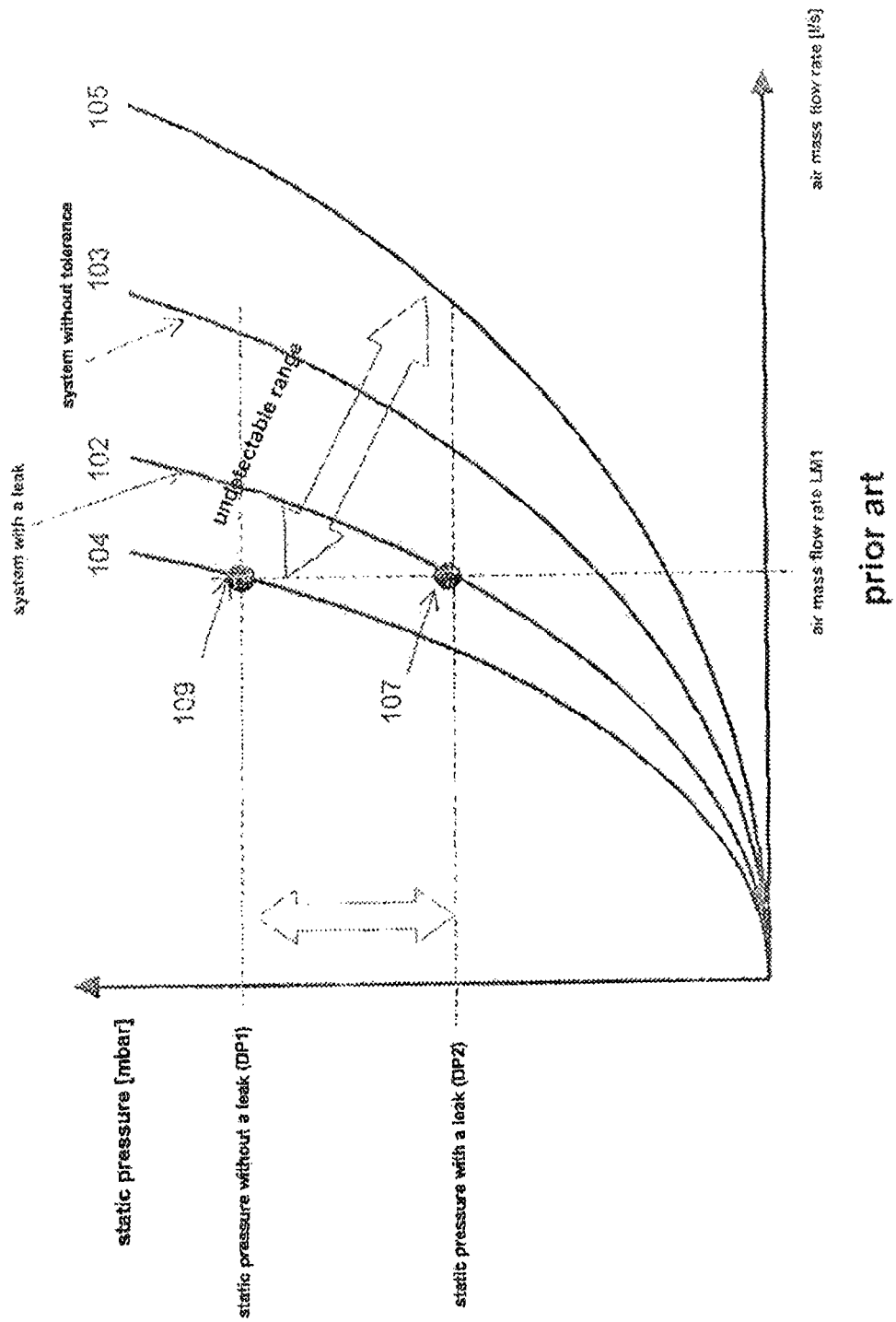

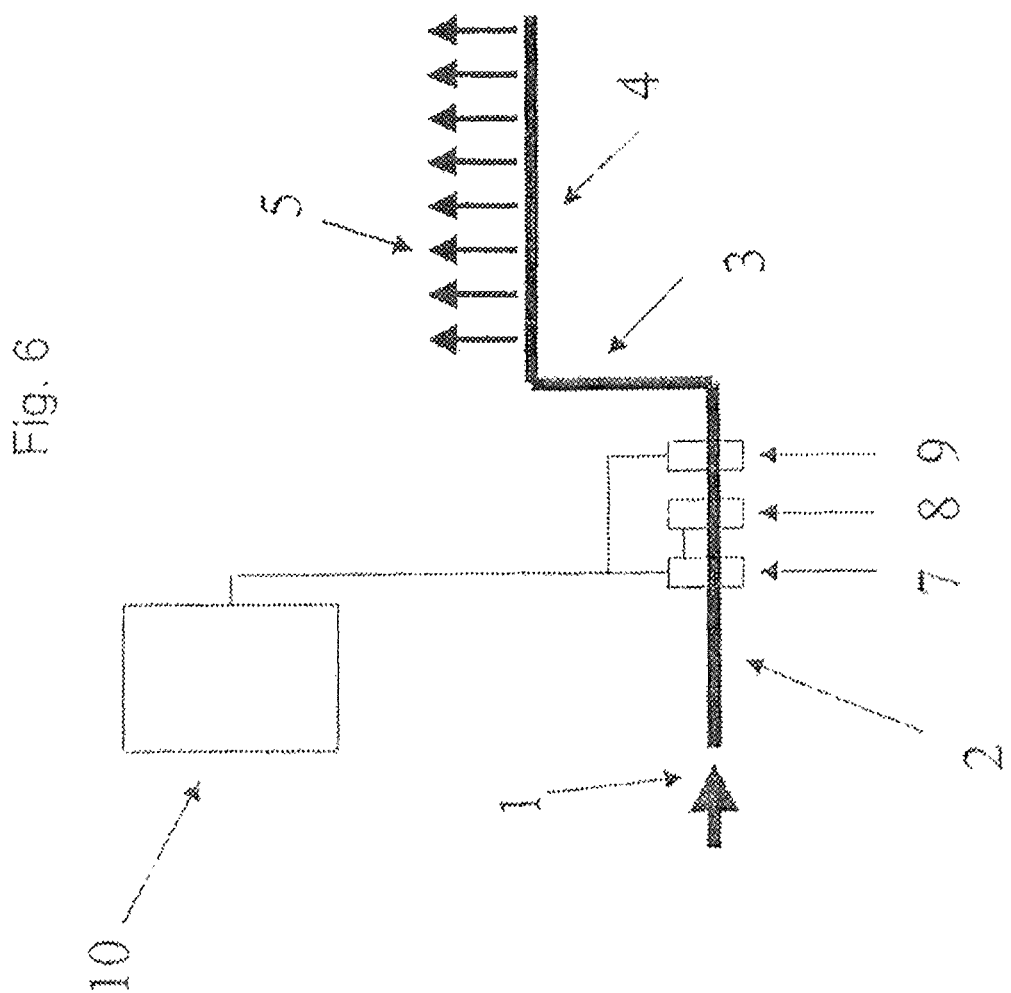

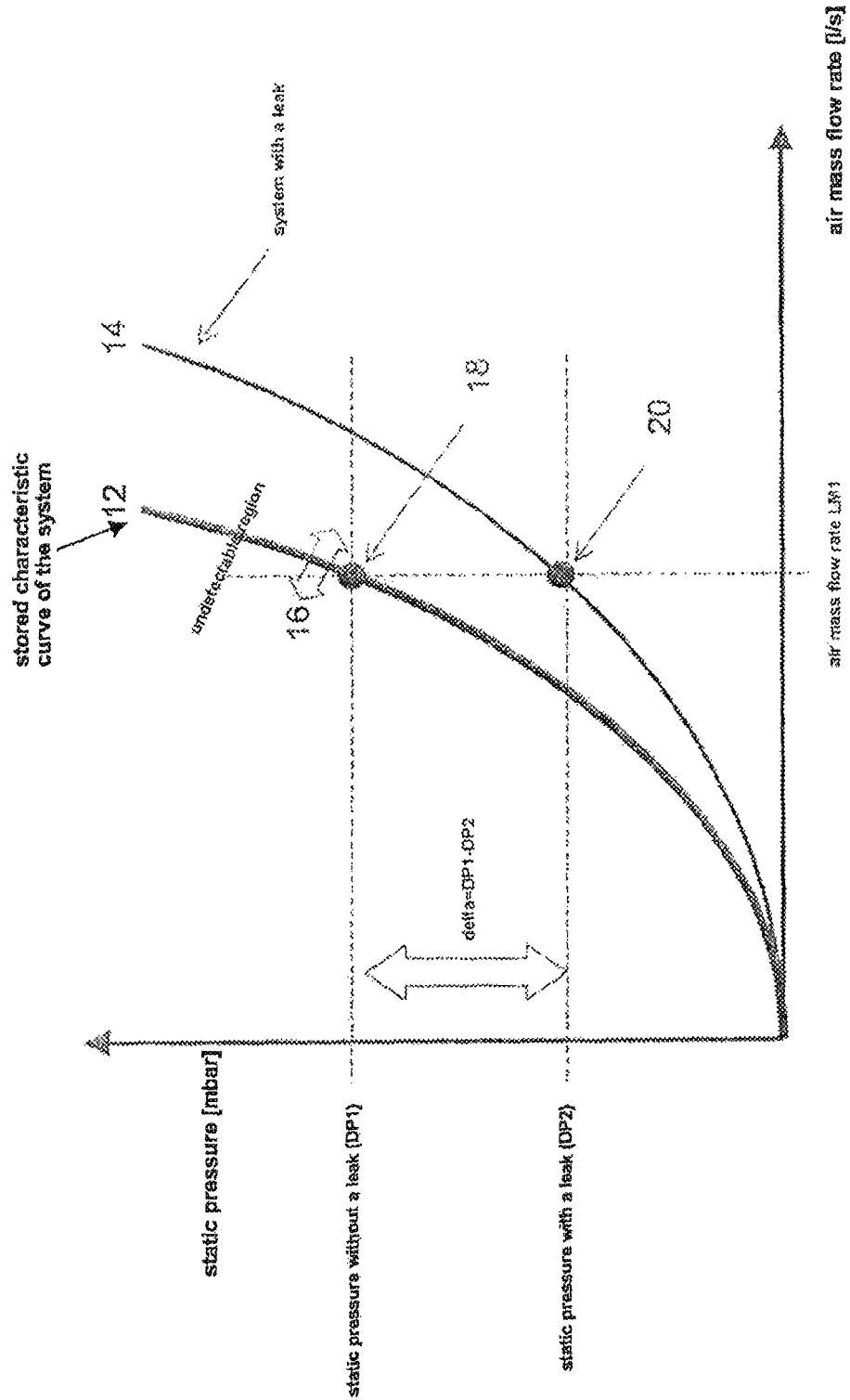

AIRCRAFT CONDUIT MONITORING SYSTEM AND METHOD

This application claims priority to PCT Application No. PCT/EP2009/004368, filed on Jun. 17, 2009, under Section 371 and/or as a continuation under Section 120, which claims priority to German Application No. 10 2008 029 469.1 and U.S. Provisional Application No. 61/074,185, both filed on Jun. 20, 2008.

TECHNICAL FIELD

The invention relates to an aircraft conduit monitoring system and method, in particular for an aircraft wing de-icing system and an aircraft air-conditioning system.

BACKGROUND

Aircrafts comprise a de-icing system which during the flight conducts hot bleed air from a propulsion unit to a wing, in particular the leading edges of the wing. As a result, during the flight the wing is maintained at a temperature at which it is ensured that no ice is formed on the wing. As is generally known, ice on a wing may lead to the aircraft crashing. The use of this de-icing system is important, in particular, during the descent of the aircraft. If the aircraft flies at high altitude, for example 10,000 meters, the air has relatively low humidity but is very cold. As a result, the wing of the aircraft is cooled to a low temperature. During the descent, the aircraft may enter more humid air layers. As the wing of the aircraft is still at a temperature of considerably below 0° C., when descending below a height of approximately 7,300 meters (approximately 22,000 feet), ice may form on the wing which may lead to a crash. As mentioned in the introduction, the hot air conducted to the leading edges of the wing has the purpose of heating the wing of the aircraft so that even during the descent no ice may be produced on the wing.

A leaking hot air conduit in a wing may have the result that the wing is not fully de-iced. Moreover, hot air enters the inside of the wing which may damage components in the wing and may impair the structural integrity of the wing.

Hot air at a temperature of approximately 200° C. and above may reduce the strength of a wing of the prior art produced from a metal. It is planned to construct wings of future generations of aircraft from a composite material, in order to reduce the weight thereof. One composite material used is glass fibre-reinforced plastics (GRP), the structural integrity thereof already being reduced at approximately 85° C. As a result, bleed air from the propulsion unit at a temperature of approximately 200° C. has to be prevented from entering a wing produced from a composite material. In a wing produced from a composite material, the entrance of hot air into the wing may have a greater impact on the structural integrity of the wing.

In order to ensure that the wings are reliably de-iced, a pressure sensor, which senses the static pressure in the conduit, and a flow sensor, which senses the volumetric air flow rate, are provided in the conduit. Optionally, a temperature sensor may be provided which senses the temperature of the air flowing through the conduit. If the temperature and the volumetric air flow rate are known, the air mass flow rate may be determined therefrom.

FIG. 1 shows a first characteristic curve 101 of the air mass flow rate over the static pressure in the conduit, if a leak is not present. The characteristic curve 102 shows the static pressure over the air mass flow rate, if a leak is present. As a result of the leak, a new characteristic of the air mass flow rate to the static pressure is produced. There may be a lower static pressure where the air mass flow rate remains the same or a higher air mass flow rate where the static pressure remains the same. However, it is also possible that both variables change. The volumetric air flow rate may be measured and calculated by means of the air temperature of the air mass flow rate.

The characteristic curve between the air mass flow rate and the static pressure is subjected to fluctuations due to manufacturing tolerances of the conduit system to a level of approximately ±5% and above. For example, mounting tolerances in the case of bends and branches in the conduit may influence the characteristic curve of the air mass flow rate and static pressure. If no tolerances are assumed, the system has the characteristic curve 103 shown in FIG. 2. If the maximum error in a first direction is assumed, the system has the characteristic curve 104 and if the maximum error in a second opposing direction is assumed, the system has the characteristic curve 105. If a point or a characteristic curve moves within the range limited by the characteristic curves 104 and 105, a leak is not able to be identified.

FIG. 3 shows the characteristic curve 103, in which no tolerances are assumed. The characteristic curve 104 shows the case in which maximum tolerance in a first direction is assumed and the characteristic curve 105 shows the case in which maximum tolerance in a second opposing direction is assumed. If a point of the characteristic curve 103 moves between the range limited by the characteristic curves 104 and 105, a leak is not able to be sensed. In the example of FIG. 3, the characteristic curve 102 shows a conduit with a leak. As the characteristic curve 102 is located outside the range defined by the characteristic curves 104 and 105, this leak may be sensed. The leak thus has to be of a relatively large volume in order to be sensed. In the example shown in FIG. 3, the operating point 106 of the system is located on the characteristic curve 104, as all components of the system have maximum tolerance in the first direction. In the case of a leak, the ratio of air mass flow rate to static pressure is displaced to the point 107. It is recognised that the static pressure has to be altered by a high value in order for the leak to be able to be sensed. This may lead to a small leak not being able to be sensed, which may nevertheless lead to the structural problems mentioned in the introduction, not only in wings made of a composite material but also in a wing of the prior art made of metal.

In FIG. 4, the case is shown in which all components of the system have maximum tolerance in the second opposing direction. Thus the operating point 108 of the system in the normal mode of operation is located on the characteristic curve 105. In the case of a leak, the operating point 107 is located on the characteristic curve 102. The system senses a leak, even with a slight alteration of the static pressure from the value DP1 to the value DP2. Thus it is possible for a small alteration in pressure to be interpreted as a leak.

In FIG. 5, the characteristic curve 103 shows the ratio of air mass flow rate to static pressure, if no tolerances are assumed. The characteristic curve 104 represents the case where all components of the system have a tolerance in the first direction and the characteristic curve 105 represents the case where all components of the system have a tolerance in the second opposing direction. In the case shown in FIG. 5, the operating point 109 of the system is located on the characteristic curve 104. All components of the system thus have a tolerance in the first direction. In the case of a leak, in the case shown in FIG. 5, the operating point 107 is located on the characteristic curve 102. Said operating point is located within the undetectable range between the characteristic curves 104 and 105, as has been described above. Thus, the system of the prior art is not able to sense a relatively large alteration to the static pressure. Thus problems with the structural integrity of the wing may
result, as hot air may enter the wing, without this being able to be identified by a system of the prior art.

The problems set forth above may be resolved by more sensors being fitted. This, however, leads to an undesired weight increase, greater complexity, increased maintenance cost and thus additional costs.

It is an object of the invention to provide an aircraft conduit monitoring system which, even with relatively large conduit component tolerances, may identify leaks or other faults.

SUMMARY OF THE INVENTION

The object of the invention is achieved by an aircraft conduit monitoring system comprising a conduit which may be installed in an aircraft, and which conducts gas from a source to a point of application. In the conduit, a flow sensing device is arranged which senses a gas mass flow rate in the conduit. A pressure sensing device senses a static pressure in the conduit. A control device is configured to sense in a learning mode of operation at least one learning mode of operation actual gas mass flow rate and to store the learning mode of operation actual gas mass flow rate as a set gas mass flow rate for a normal mode of operation. The is control device is also configured to sense a learning mode of operation actual pressure and to store said learning mode of operation actual pressure as a set pressure for the normal mode of operation. In the learning mode of operation of the aircraft conduit monitoring system according to the invention, a leak in the conduit to be monitored is excluded, so that the values sensed in the learning mode of operation of the learning mode of operation actual gas mass flow rate and the learning mode of operation actual pressure correspond to gas mass flow rate values and pressure values in a conduit without a leak. In the normal mode of operation, i.e. an operating state in which, in contrast to the learning mode of operation, leaks in the conduit to be monitored are no longer excluded, the control device compares a normal mode of operation actual gas mass flow rate with the set gas mass flow rate and/or a normal mode of operation actual pressure with the set pressure. If the normal mode of operation actual gas mass flow rate deviates by more than a threshold value from the set gas mass flow rate and/or if the normal mode of operation actual pressure deviates by more than a threshold value from the set pressure, a signal is emitted which indicates a deviation. The term "gas" also encompasses a gas mixture, for example air, and any gaseous fluid.

The point of application may be an air outlet on a wing or a nozzle in a passenger cabin. As already mentioned, for example bends in the conduit, branches and other mounting tolerances impair the characteristic between the air mass flow rate and static pressure. The sensitivity of the aircraft conduit monitoring system is not impaired by these tolerances as the influence of these tolerances is taken into account in the learning mode of operation of the control device. The aircraft conduit monitoring system also has the advantage that static tolerances of the flow sensing device, the pressure sensing device and the temperature sensor do not restrict the sensitivity of the system. The aircraft conduit monitoring system described above is suitable, in particular, for applications where only one operating point of the air mass flow rate and static pressure is used in the normal mode of operation.

The aircraft conduit monitoring system may sense in the learning mode of operation a plurality of learning mode of operation actual gas mass flow rate values at different learning mode of operation actual pressures. The control device assigns each learning mode of operation actual gas mass flow rate to a learning mode of operation actual pressure. Each learning mode of operation actual gas mass flow rate is stored as a set gas mass flow rate and each learning mode of operation actual pressure is stored as a set pressure for a normal mode of operation. The control device also stores an association between the respective set pressure and the respective set volumetric flow rate. In the normal mode of operation, the control device obtains a normal mode of operation actual gas mass flow rate value from the flow sensing device and a normal mode of operation actual pressure value from the pressure sensing device. The set gas mass flow rate assigned to the normal mode of operation actual pressure is compared with the normal mode of operation actual gas mass flow rate. If the normal mode of operation actual gas mass flow rate deviates by more than a threshold value from the desired gas mass flow rate, the control device emits a signal which indicates a deviation. The control device may alternatively or additionally in the normal mode of operation obtain a normal mode of operation actual gas mass flow rate from the flow sensing device and obtain a normal mode of operation actual pressure from the pressure sensing device. The set pressure assigned to the normal mode of operation actual gas mass flow rate is compared with the normal mode of operation actual pressure. If the normal mode of operation actual pressure deviates by more than a threshold value from the set pressure, the control device emits a signal which indicates a deviation. It is understood that the control device may emit a signal which indicates a deviation and/or may emit a signal or provide a value which indicates the extent of the deviation.

In said aircraft conduit monitoring system, a plurality of points are plotted on the characteristic curve of the gas mass flow rate to static pressure in the conduit. This system is suitable for an application where, during operation, the values of the gas mass flow rate and/or the static pressure are varied according to the mode of operation. Any number of points may be plotted on the characteristic curve. Also, the control device may interpolate between the plotted points. This interpolation may take place during the learning mode of operation or during the normal mode of operation. As a result of the interpolation, apart from numerical inaccuracies and according to the interpolation method used, the association between the desired pressure and the desired volumetric flow rate is maintained.

The flow sensing device may comprise a venturi nozzle and provide a difference between a pressure prevailing upstream of the venturi nozzle and a pressure prevailing downstream of the venturi nozzle as a measure of the gas volume flow rate.

The flow sensing device may also be a so-called hot-wire anemometer. A hot-wire anemometer has a temperature-dependent electrical resistor, which is electrically heated. The electrical conductor is cooled depending on the flow velocity. The temperature of the electrical resistor may be determined by means of a measurement of the resistance, from which the flow velocity may be deduced.

If the flow sensing device is only able to sense a gas volume flow rate, a temperature sensor may be provided in the conduit or in the flow sensing device. The gas volume flow rate corresponds to the quotient of the gas mass flow rate and the density of the gas or gas mixture. The density of the gas or gas mixture depends on the temperature.

Due to the physical association between the gas mass flow rate and the gas volume flow rate disclosed above, a gas mass flow rate value may be replaced by a gas volume flow rate value. The flow sensing device may sense a gas volume flow rate and the control device may process a gas volume flow rate value instead of a gas mass flow rate value. It is also conceivable that the flow sensing device senses a gas volume flow rate and the control device calculates a gas mass flow rate value by means of a temperature value. The flow sensing device may sense the gas volume flow rate and determine and provide the gas mass flow rate by means of a sensed temperature.

An aircraft wing de-icing system according to the invention comprises the aircraft conduit monitoring system disclosed above. The point of application at which the conduit of the aircraft conduit monitoring system conducts the gas flowing through the conduit comprises at least one gas outlet in an aircraft wing. The aircraft wing may be a wing of a conventional aircraft or a wing moving relative to the aircraft in the form of a rotor wing of a helicopter.

An aircraft air-conditioning system according to the invention comprises the aircraft conduit monitoring system disclosed above. The point of application at which the conduit of the aircraft conduit monitoring system conducts the gas flowing through the conduit is, for example, at least one nozzle which supplies air to the cabin.

The invention also relates to a method for monitoring a gas mass flow rate in a conduit installed in an aircraft from a gas source to a point of application in a learning mode of operation and a normal mode of operation. In the learning mode of operation, a learning mode of operation actual gas mass flow rate is determined, a learning mode of operation actual pressure is determined and the learning mode of operation actual gas mass flow rate is stored as a set gas mass flow rate and the learning mode of operation actual pressure is stored as a set pressure. In the normal mode of operation, a normal mode of operation actual gas mass flow rate is determined, a normal mode of operation actual pressure is determined, the normal mode of operation actual gas mass flow rate is compared with the set mass flow rate and/or the normal mode of operation actual pressure is compared with the set pressure and a warning signal is emitted if the normal mode of operation actual gas mass flow rate deviates from the set gas mass flow rate by more than a threshold value and/or the normal mode of operation actual pressure deviates from the set pressure by more than a threshold value.

The method may sense in the learning mode of operation a plurality of learning mode of operation actual gas mass flow rate values at different learning mode of operation actual pressures. Each learning mode of operation actual gas mass flow rate is assigned to the respective learning mode of operation actual pressure. Each learning mode of operation actual gas mass flow rate is stored as a set gas mass flow rate, each learning mode of operation actual pressure is stored as a set pressure and also an association between the respective desired pressure and the respective set gas mass flow rate is stored.

In the normal mode of operation, the method senses the normal mode of operation gas mass flow rate and senses the normal mode of operation actual pressure. Subsequently, the set gas mass flow rate assigned to the normal mode of operation actual pressure is compared with the normal mode of operation actual gas mass flow rate and/or the set pressure assigned to the normal mode of operation actual gas mass flow rate is compared with the normal mode of operation actual pressure. A warning signal is emitted if the normal mode of operation actual gas mass flow rate deviates from the respective set gas mass flow rate or the normal mode of operation actual pressure deviates from the respective set pressure by more than a threshold value. The method may interpolate between at least two set pressure values and/or at least two set gas mass flow rate values.

The method may be controlled at least partially by the control device disclosed above. The control device may be implemented by a computer comprising a memory. It is understood that the control device may also be configured by a plurality of separate devices which implement one or more steps of the method disclosed above. For example, the control device may comprise a memory device, a comparator device, an output device, an interpolation device and the like.

In the method according to the invention, a gas volume flow rate value may be sensed and processed instead of a gas mass flow rate value. Thus, the physical associations disclosed above may be used.

The method may be used for sensing a fault in the air supply when de-icing an aircraft wing. The point of application at which the conduit of the aircraft conduit monitoring system conducts the gas flowing through the conduit thus comprises at least one gas outlet in the aircraft wing. The method may be used for monitoring the air supply when air-conditioning the aircraft cabin. In this method, for example, at least one air outlet nozzle in the cabin forms the point of application at which the conduit of the aircraft conduit monitoring system conducts the gas flowing through the conduit.

BRIEF DESCRIPTION OF THE DRAWINGS

The invention is described in more detail hereinafter with reference to the following figures, in which:

FIG. 1 shows a characteristic curve of the static pressure over the air mass flow rate, if a conduit does not have a leak, and a further characteristic curve of the static pressure over the air mass flow rate, if the conduit has a leak, in a system of the prior art, FIG. 2 shows a range in which a leak may not be identified in a system of the prior art, due to tolerances, FIGS. 3, 4 and 5 show different problems which may occur when identifying leaks, FIG. 6 shows an air conduit system comprising the aircraft conduit monitoring system according to the invention and FIG. 7 shows a characteristic curve of the static pressure over the air mass flow rate and a range in which it is not possible to sense a leak, in an aircraft conduit monitoring system according to the invention.

DETAILED DESCRIPTION

FIG. 6 shows an air conduit system which comprises a first conduit 2, a second conduit 3 and a third conduit which are arranged in succession. An air flow 1 is fed into the first conduit 2. The air flow 1 may be hot bleed air from the propulsion unit. The third conduit 4 comprises openings 5 through which the air emerges from the conduit. The openings 5 may be located transversely to the direction of the air flow and/or in the same direction as the air flow. In addition, just one opening may be provided. The openings 5 may, for example, be located in a wing of an aircraft, in order to de-ice the wing.

It is also possible for the air flow 1 to be supplied by an air-conditioning unit, and for the openings 5 to be located in a cabin of an aircraft.

A flow sensing device 7, an optional temperature sensor 8 and a pressure sensing device 9 are located in the first conduit 2. The optional temperature sensor 8 is coupled to the flow sensing device 7. The flow sensing device 7 and the pressure sensing device 9 are coupled to a control device 10. It is also possible that the optional temperature sensor 8 is not coupled to the flow sensing device 7 but to the control device 10.

The flow sensing device 7 may comprise a venturi nozzle and provide a pressure difference upstream and downstream of the venturi nozzle as a measurement of the gas volume flow rate.

The flow sensing device 7 may also be a so-called hot-wire anemometer. A hot-wire anemometer comprises a temperature-dependent electrical resistor, which is electrically heated. The electrical conductor is cooled depending on the flow velocity. The temperature of the electrical resistor may be determined by means of a measurement of the resistance, from which the flow velocity may be deduced.

The volumetric air flow rate is the quotient of the air mass flow rate and the density of air. The density of air depends on the temperature. Thus the air mass flow rate may be calculated from a sensed volumetric air flow rate and a temperature.

The flow sensing device 7 and the temperature sensor 8 provide an actual value of the air mass flow rate. The pressure sensing device 9 provides an actual value of the static pressure in the first conduit.

In a learning mode of operation, a learning mode of operation actual gas mass flow rate and a learning mode of operation actual pressure are sensed. In the learning mode of operation it is ensured that a leak is not present in the conduit 2, 3, 4. The control device 10 stores the learning mode of operation actual air mass flow rate as a set air mass flow rate and the learning mode of operation actual pressure as a set pressure.

In the normal mode of operation, the normal mode of operation actual air mass flow rate and the normal mode of operation actual pressure are determined. The normal mode of operation actual air mass flow rate is compared with the set air mass flow rate and/or the normal mode of operation actual pressure is compared with the set pressure by the control device. A warning signal is emitted if the normal mode of operation actual air mass flow rate deviates from the set air mass flow rate by more than a threshold value or the normal mode of operation actual pressure deviates from the set pressure by more than a threshold value.

This procedure is appropriate if the air conduit system is only operated at the desired pressure or desired air mass flow rate. This may be the case in a de-icing system for a wing of an aircraft.

In the learning mode of operation, a plurality of learning mode of operation actual air mass flow rate values may also be determined at the respective different learning mode of operation actual pressures. Each learning mode of operation actual air mass flow rate is assigned to the respective learning mode of operation actual pressure. The control device 10 stores each learning mode of operation actual air mass flow rate value as a set air mass flow rate value, each learning mode operation actual pressure value as a set pressure value and an association between the respective set pressure or the respective set air mass flow rate. The association may be achieved by storage in pairs, by storage in a table, by indexes or the like.

Thus the characteristic curve of the system denoted by the reference numeral 12 in FIG. 7 of the static pressure is produced depending on the air mass flow rate. The characteristic curve of the system 12 takes into account the effects of conduit bends, conduit branches, a conduit diameter as well as the variation thereof. This characteristic curve also senses the static measuring errors of the components recording and processing the measured values in the air conduit system. A range 16 in which a leak may not be identified only comprises the dynamic tolerances of the components recording and processing measured values, for example the ageing thereof and the temperature variation thereof. Depending on the design, said range may also comprise the ageing and temperature variation of the conduit components. Thus the range 16 in which a leak may not be identified is substantially smaller than in a system of the prior art.

It is understood that it is possible to interpolate between the set air mass flow rate values and/or set pressure values. The interpolation may be carried out during the learning mode of operation or the normal mode of operation. To this end, different techniques are known, for example a polynominal interpolation or spline interpolation and the like, so that these interpolation methods require no further explanation.

Typically, the learning mode of operation is only required once after assembling the aircraft or after replacing conduit components of the air conduit system, the flow sensing device, the temperature sensor or the pressure sensing device. The learning mode of operation may also be repeated during maintenance in order to take into account the appearance of ageing of the components recording and processing measured values and in order to keep the range 16 in which the leak may not be identified as small as possible.

During the normal mode of operation, i.e. during the flight, the normal mode of operation actual air mass flow rate and the normal mode of operation actual pressure are sensed. The set air mass flow rate assigned to the normal mode of operation actual pressure is compared with the normal mode of operation actual air mass flow rate. Additionally or alternatively, the set pressure assigned to the normal mode of operation actual air mass flow rate may be compared with the normal mode of operation actual pressure. A warning signal is emitted if the normal mode of operation actual air mass flow rate deviates from the respective set air mass flow rate or the actual normal mode of operation pressure deviates from the respective set pressure by more than a threshold value.

During the learning mode of operation, the control device assigns the static pressure DP1 to the air mass flow rate LM1. The air mass flow rate LM1 is stored as the set air mass flow rate and the static pressure DP1 is stored as the set pressure. This point of the characteristic curve is identified by the reference numeral 18. During the normal mode of operation, the air mass flow rate LM1 and the static pressure DP2 are sensed. This point is identified by the reference numeral 20.

The set pressure DP1 is assigned to the air mass flow rate LM1. The normal mode of operation actual pressure is, however, DP2. The difference between DP1 and DP2 is greater than a predetermined threshold value. Thus the control device 10 indicates that a leak is present.

The present invention has the advantage that, in addition to a leak, a partial or complete blockage of a conduit and/or a nozzle or an alteration to the air source may also be identified, as this alters the characteristic curve of the static pressure over the air mass flow rate. Moreover, the present invention may take into account static measuring errors of the measuring sensor used. The present invention may also take into account influences as a result of bends in the conduits, conduit branches and the like. The range 16 in which a fault in the air conduit system may not be identified is substantially smaller in the aircraft conduit monitoring system according to the invention than in the prior art. The present invention provides a safer aircraft, as the de-icing of the wing may be monitored more effectively. Moreover, the entrance of hot air into the wing and the risk thus entailed of structural instabilities, in particular when using composite materials in the wing, may be sensed more reliably than in the prior art. Moreover, a more comfortable aircraft is provided, as the function of the air-conditioning system may be monitored more effectively.

The invention claimed is:

1. Aircraft conduit monitoring system comprising
a conduit that conducts gas from a source to a point of application,
a flow sensing device for sensing a gas mass flow rate in the conduit,
a pressure sensing device for sensing a static pressure in the conduit and
a control device which is configured
to sense in a learning mode of operation at least one learning mode of operation actual gas mass flow rate value and to store the learning mode of operation actual gas mass flow rate value as a set gas mass flow rate for a normal mode of operation and to sense a learning mode of operation actual pressure value and to store the learning mode of operation actual pressure value as a set pressure for the normal mode of operation and
to compare in the normal mode of operation a normal mode of operation actual gas mass flow rate with the set gas mass flow rate and/or to compare a normal mode of operation actual pressure with the set pressure, and if the normal mode of operation actual gas mass flow rate deviates by more than a threshold value from the set gas mass flow rate and/or if the normal mode of operation actual pressure deviates by more than a threshold value from the set pressure, to emit a signal which indicates a deviation,
characterised in that the control device is further configured to sense in the learning mode of operation a plurality of learning mode of operation actual gas mass flow rate values at different learning mode of operation actual pressures, to assign each learning mode of operation actual gas mass flow rate value to a corresponding learning mode of operation actual pressure value, and to store each learning mode of operation actual gas mass flow rate value as a set gas mass flow rate for a normal mode of operation, each learning mode of operation actual pressure value as a set pressure for a normal mode of operation and an association between the respective set pressure and the respective set gas mass flow rate.

2. Aircraft conduit monitoring system according to claim 1, characterised in that the control device is further configured
to obtain in the normal mode of operation a normal mode of operation actual gas mass flow rate from the flow sensing device and to obtain a normal mode of operation actual pressure from the pressure sensing device, to compare the set gas mass flow rate assigned to the normal mode of operation actual pressure with the normal mode of operation actual gas mass flow rate, and if the normal mode of operation actual gas mass flow rate deviates by more than a threshold value from the set gas mass flow rate, to emit the signal which indicates a deviation, and/or
to obtain in the normal mode of operation a normal mode of operation actual gas mass flow rate from the flow sensing device, and to obtain a normal mode of operation actual pressure from the pressure sensing device, to compare the set pressure assigned to the normal mode of operation actual gas mass flow rate with the normal mode of operation actual pressure, and if the normal mode of operation actual pressure deviates by more than a threshold value from the set pressure, to emit the signal which indicates a deviation.

3. Aircraft conduit monitoring system according to claim 1, characterised in that the control device is configured to interpolate between at least two set pressure values and/or at least two set gas mass flow rate values.

4. Aircraft conduit monitoring system according to claim 1, characterised in that the flow sensing device comprises a venturi nozzle and provides a difference between a pressure prevailing upstream of the venturi nozzle and a pressure prevailing downstream of the venturi nozzle, where the temperature of the gas provides a measure of the gas mass flow rate.

5. Aircraft conduit monitoring system according to claim 1, characterised in that the flow sensing device senses a gas volume flow rate and the control device is designed to process a gas volume flow rate value instead of a gas mass flow rate value.

6. Aircraft wing de-icing system comprising an aircraft conduit monitoring system according to claim 1, the point of application at which the conduit of the aircraft conduit monitoring system conducts the gas flowing through the conduit comprising at least one gas outlet in an aircraft wing.

7. Aircraft air-conditioning unit comprising an aircraft conduit monitoring system according to claim 1.

8. Method for monitoring a gas mass flow rate in a conduit installable in an aircraft, which conducts gas from a source to a point of application, wherein the following steps are carried out in a learning mode of operation:
determining a learning mode of operation actual gas mass flow rate value of the gas flowing in the conduit,
determining a learning mode of operation actual pressure value of a static pressure in the conduit and
storing the learning mode of operation actual gas mass flow rate value as a set gas mass flow rate and the learning mode of operation actual pressure value as a set pressure, and wherein
in the normal mode of operation the following steps are carried out:
determining a normal mode of operation actual gas mass flow rate in the conduit,
determining a normal mode of operation actual pressure value of the static pressure in the conduit,
comparing the normal mode of operation actual gas mass flow rate with the set gas mass flow rate and/or comparing the normal mode of operation actual pressure value with the set pressure and
emitting a warning signal if the normal mode of operation actual gas mass flow rate deviates from the set gas mass flow rate by more than a threshold value and/or the normal mode of operation actual pressure deviates from the set pressure by more than a threshold value,
characterised in that in the learning mode of operation the following steps are also carried out:
determining a plurality of learning mode actual gas mass flow rate values of operation at different learning mode of operation actual pressures,
assigning each learning mode of operation actual gas mass flow rate value to the respective learning mode of operation actual pressure value and
storing each learning mode of operation actual gas mass flow rate value as a set gas mass flow rate for a normal mode of operation, each learning mode of operation actual pressure value as a set pressure for a normal mode of operation and an association between the respective set pressure and the respective set gas mass flow rate.

9. Method according to claim 8,
characterised in that in the normal mode of operation the following steps are also carried out:
- sensing the normal mode of operation actual gas mass flow rate,
- sensing the normal mode of operation actual pressure,
- comparing the set gas mass flow rate assigned to the normal mode of operation actual pressure with the normal mode of operation actual gas mass flow rate and/or comparing the set pressure assigned to the normal mode of operation actual gas mass flow rate with the normal mode of operation actual pressure and
- emitting a warning signal if the normal mode of operation actual gas mass flow rate deviates from the respective set gas mass flow rate and/or the normal mode of operation actual pressure deviates from the respective set value by more than a threshold value.

10. Method according to claim 8,
characterised by the step of interpolation between at least two desired pressure values and/or at least two desired gas mass flow rate values.

11. Method according to claim 8, characterised in that a gas volume flow rate value is sensed and processed instead of a gas mass flow rate value.

12. Method for monitoring the de-icing of an aircraft wing comprising the steps of the method according to claim 8, the point of application at which the conduit conducts the gas flowing through the conduit comprising at least one gas outlet nozzle in the aircraft wing.

13. Method for monitoring the air-conditioning of an aircraft cabin comprising the steps of the method according to claim 8.

* * * * *